US012331681B2

(12) United States Patent
Muniz

(10) Patent No.: US 12,331,681 B2
(45) Date of Patent: Jun. 17, 2025

(54) AIRCRAFT PRECIPITATION MONITORING SYSTEM

(71) Applicant: RTX Corporation, Farmington, CT (US)

(72) Inventor: Luis Alexander Muniz, Palm Beach Gardens, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/314,272

(22) Filed: May 9, 2023

(65) Prior Publication Data
US 2024/0376844 A1    Nov. 14, 2024

(51) Int. Cl.
*F02C 7/057* (2006.01)
*F02C 7/047* (2006.01)
*G01V 3/08* (2006.01)

(52) U.S. Cl.
CPC .............. *F02C 7/047* (2013.01); *G01V 3/088* (2013.01); *F05D 2270/313* (2013.01)

(58) Field of Classification Search
CPC ... F02C 7/04; F02C 7/05; F02C 7/057; B64D 33/02; B64D 45/00; B64D 2045/0085; F05D 2260/95; F05D 2270/11
See application file for complete search history.

(56) References Cited

U.S. PATENT DOCUMENTS

| 6,237,874 | B1 * | 5/2001 | Rutherford | B64D 15/14 244/134 R |
| 8,074,498 | B2 | 12/2011 | Agrawal et al. | |
| 8,204,671 | B2 | 6/2012 | Agrawal et al. | |
| 8,256,277 | B2 * | 9/2012 | Khibnik | G01N 15/1031 73/112.01 |

(Continued)

FOREIGN PATENT DOCUMENTS

| EP | 2538199 A2 | 12/2012 |
| EP | 2273075 A3 | 7/2014 |
| EP | 3889395 A1 | 10/2021 |

OTHER PUBLICATIONS

Search Report issued in European Patent Application No. 24174960.5; Application Filing Date May 8, 2024, Date of Mailing Sep. 25, 2024 (6 pages).

*Primary Examiner* — Todd E Manahan
*Assistant Examiner* — Sean V Meiller
(74) *Attorney, Agent, or Firm* — CANTOR COLBURN LLP

(57) ABSTRACT

An aircraft system includes a gas turbine engine, an altitude sensor configured to measure an altitude of the aircraft, and an electrostatic charge sensor inlet debris monitoring system configured to detect particulates entering the engine. The aircraft system further includes a precipitation monitoring controller configured to determine the presence of sea spray based on the altitude and the presence of precipitation based on an amount of particulates entering the inlet, and detects (Continued)

an ingestion of salt into the gas turbine engine in response to detecting a presence of both the sea spray and the amount of particulates entering the inlet. In addition, the precipitation monitoring controller is configured to determine a presence of ice accretion in the engine based on the temperature and an amount of the particulates, and to activate an anti-icing system in response to determining the presence of ice accretion.

12 Claims, 8 Drawing Sheets

(56) References Cited

U.S. PATENT DOCUMENTS

| | | | |
|---|---|---|---|
| 8,459,103 | B2 | 6/2013 | Khilbnik et al. |
| 9,909,971 | B2 * | 3/2018 | Knobloch ................. F02C 7/05 |
| 10,845,294 | B1 | 11/2020 | Lincoln et al. |
| 11,149,583 | B2 * | 10/2021 | Dischinger ............. F01D 17/02 |
| 11,268,449 | B2 * | 3/2022 | Escriche ............... F01D 25/002 |
| 2011/0179763 | A1 | 7/2011 | Rajamani et al. |
| 2020/0079532 | A1 * | 3/2020 | Rix ........................ B64D 45/00 |

* cited by examiner

AIRCRAFT PRECIPITATION MONITORING SYSTEM

BACKGROUND

The present disclosure relates generally to aircraft systems, and more particularly, to an aircraft precipitation monitoring system.

Environments with heavy icing or sea spray can compromise engine performance and operability. For instance, ice accretion in the engine inlet and on the fan inlet guide vanes and struts can degrade engine performance and increase chances of engine stall. Aircraft therefore may implement an aircraft inlet ice detection system, which detects ice accretion and signals the engine ice protection system to begin de-icing the engine inlet, e.g., the fan struts, inlet guide vanes, nose cone, etc. With the ability to sense precipitation, the engine can activate the anti-ice system prior to the ice accretion on surfaces in the engine inlet and/or other critical surfaces, such as without input from a pilot or other crewmember.

The presence of sea spray while landing near a body of salt water, such as on a runway at or proximate sea level, for example, can also reduce engine performance by coating the fan/compressor with salt. Salt contamination can reduce engine performance and increase risk of engine stall events. Salt contamination management currently involves ground crew personnel manually removing salt buildup by perform engine water washes at certain (e.g., pre-determined) intervals. The salt removal maintenance service, however, is currently performed regardless of particular level of salt contamination, salt buildup, and/or performance loss of a particular engine.

BRIEF DESCRIPTION

According to a non-limiting embodiment of the present disclosure, an aircraft system includes a gas turbine engine including an inlet configured to ingest air and generate thrust to power an aircraft, an altitude sensor configured to measure an altitude of the aircraft, and an electrostatic charge sensor inlet debris monitoring system configured to detect particulates entering the inlet. The aircraft system further includes a precipitation monitoring controller in signal communication with the inlet debris monitoring system and the altitude sensor. The precipitation monitoring controller determines the presence of sea spray based on the altitude and the presence of precipitation based on an amount of particulates entering the inlet, and detects an ingestion of salt into the gas turbine engine in response to detecting a presence of both the sea spray and the amount of particulates entering the inlet.

According to one or more non-limiting embodiments, the controller generates an alert to perform a salt removal maintenance service in response to detecting the ingestion of salt.

According to one or more non-limiting embodiments, the controller stores a sea spray envelope defining an altitude range associated with the sea spray, and wherein the controller determines the presence of sea spray when the altitude is within the altitude range.

According to one or more non-limiting embodiments, the inlet debris monitoring system includes at least one electrostatic ring sensor in signal communication with the precipitation monitoring controller and configured to generate an electrostatic field having a charge intensity, and wherein the precipitation monitoring controller determines the amount of particulates entering the gas turbine engine based on the charge intensity of the electrostatic field.

According to one or more non-limiting embodiments, the precipitation monitoring controller compares the charge intensity to a charge intensity threshold, and determines the presence of precipitation in response to the charge intensity meeting or exceeding the charge intensity threshold.

According to one or more non-limiting embodiments, precipitation monitoring controller detects the ingestion of salt in response to determining both the presence of precipitation and the charge intensity meeting or exceeding the charge intensity threshold.

According to one or more non-limiting embodiments, a temperature sensor is in signal communication with the precipitation monitoring controller and configured to measure an ambient temperature of the gas turbine engine, wherein the precipitation monitoring controller is configured to determine the presence of icing conditions based on the ambient temperature and the amount of particulates entering the inlet.

According to one or more non-limiting embodiments, an anti-icing system coupled to the gas turbine engine and configured to heat the inlet of the engine in response to receiving an activation signal from the precipitation monitoring controller, wherein the precipitation monitoring controller outputs the activation signal in response to at least one of determining the presence of the icing conditions and detecting accretion of ice in the gas turbine engine.

According to one or more non-limiting embodiments, the controller stores an icing accretion model defining potential ice accretion in the gas turbine engine based on at least one of a temperature range and an altitude, and wherein the controller determines the presence of the icing conditions when the ambient temperature is within the temperature range.

According to another non-limiting embodiment, an aircraft system comprises a gas turbine engine including an inlet configured to ingest air and generate thrust to power an aircraft, a temperature sensor configured to determine ambient temperature surrounding the aircraft, and an electrostatic charge sensor inlet debris monitoring system configured to detect particulates entering the inlet. The aircraft system further includes a precipitation monitoring controller in signal communication with the inlet debris monitoring system and the temperature sensor. The precipitation monitoring controller is configured to determine a presence of ice accretion in the engine based on the temperature and an amount of the particulates, and to activate an anti-icing system in response to determining the presence of ice accretion.

According to another non-limiting embodiment, a method of detecting salt ingestion in a gas turbine engine of an aircraft. The method comprises measuring an altitude of the aircraft, detecting particulates entering an inlet of the gas turbine engine, and determining a likelihood of a presence of sea spray is at or above a first threshold based on the altitude. The method further includes determining a presence of precipitation based on a determination that an amount of particulates entering the inlet is at or above a second threshold and detecting an ingestion of salt into the gas turbine engine in response to determining that the likelihood of the presence of sea spray is at or above the first threshold and the presence of precipitation.

According to one or more non-limiting embodiments, the method further comprises generating an alert to perform a salt removal maintenance service in response to detecting the ingestion of salt.

According to one or more non-limiting embodiments, the method further comprises detecting the ingestion of salt into the gas turbine engine based on a sea spray envelope defining an altitude range associated with sea spray.

According to one or more non-limiting embodiments, the method further comprises determining the presence of sea spray based on the sea spray envelope in response to the altitude being within the altitude range.

According to one or more non-limiting embodiments, detecting the particulates entering an inlet of the gas turbine engine comprises generating, by at least one electrostatic ring sensor, an electrostatic field having a charge intensity; and determining, by a controller, the presence of particulates based on the charge intensity of the electrostatic field.

According to one or more non-limiting embodiments, the method further comprises comparing the charge intensity to a charge intensity threshold; and determining the presence of precipitation in response to the charge intensity exceeding the charge intensity threshold.

According to one or more non-limiting embodiments, the method further comprises detecting the ingestion of salt in response to determining both the presence of precipitation and the charge intensity exceeding the charge intensity threshold.

According to one or more non-limiting embodiments, the method further comprises measuring an ambient temperature of the gas turbine engine; and determining a presence of icing conditions based on the ambient temperature and the amount of particulates entering the inlet.

According to one or more non-limiting embodiments, the method further comprises heating the inlet of the engine in response to at least one of determining the presence of the icing conditions and detecting accretion of ice in the gas turbine engine.

According to one or more non-limiting embodiments, the method further comprises at least one of the presence of the icing conditions and the accretion of ice in the gas turbine engine is determine based on an icing accretion model defining potential ice accretion in the gas turbine engine.

According to yet another non-limiting embodiment, an aircraft system comprises a gas turbine engine including an inlet configured to ingest air and generate thrust to power an aircraft, a temperature sensor configured to determine ambient temperature surrounding the aircraft, and an electrostatic charge sensor inlet debris monitoring system configured to detect particulates entering the inlet. The aircraft system further includes a precipitation monitoring controller in signal communication with the inlet debris monitoring system and the temperature sensor, the precipitation monitoring controller configured to determine a presence of ice conditions based on the temperature and an amount of the particulates, and to activate an anti-icing system in response to determining the presence of the ice conditions.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
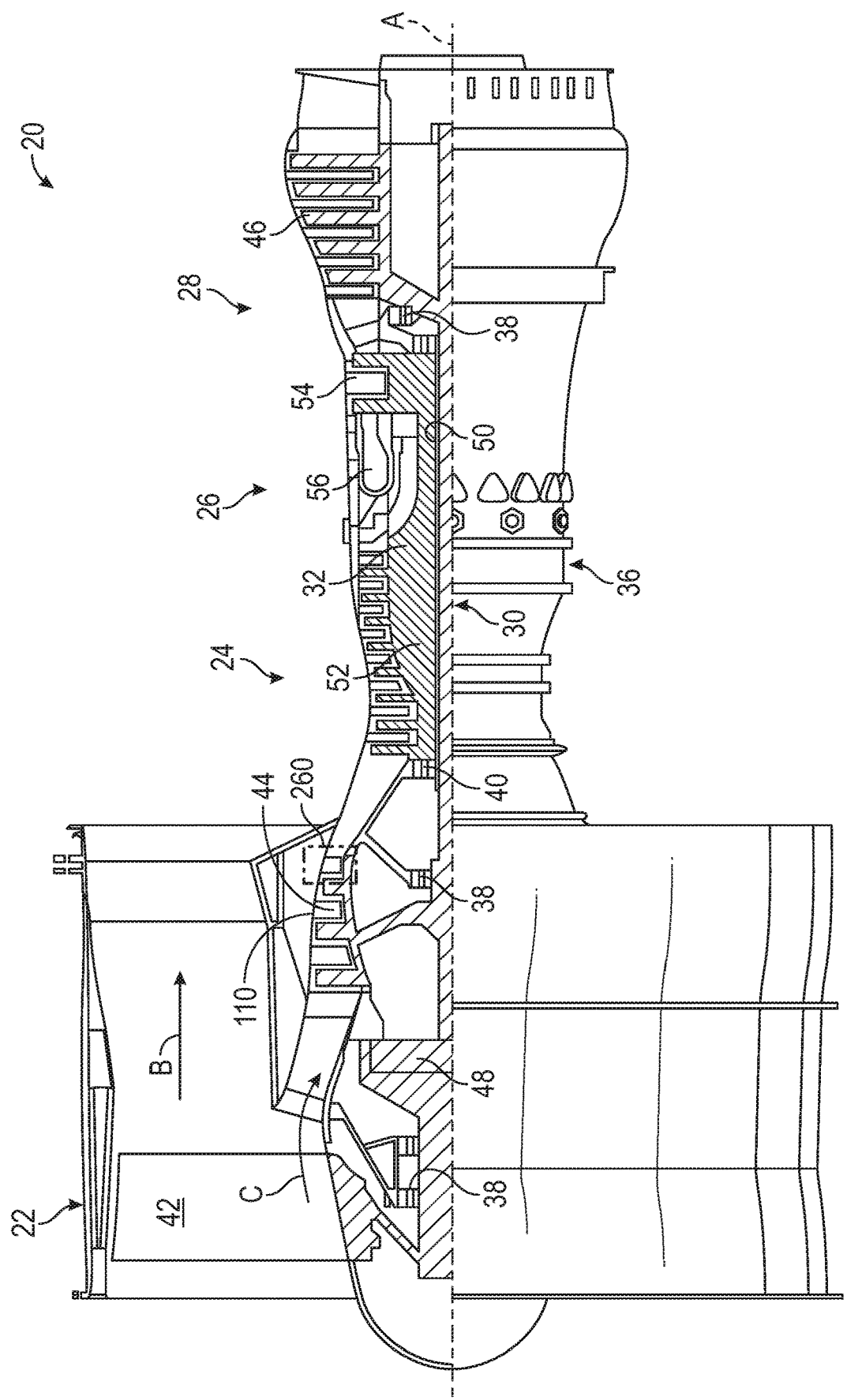
FIG. 1 is a partial cross-sectional view of a gas turbine engine.

A detailed description of one or more embodiments of the disclosed apparatus and method are presented herein by way of exemplification and not limitation with reference to the Figures.

Non-limiting embodiments of the present disclosure provide an aircraft precipitation monitoring system, which detects precipitation including, rain, cloud presence, ice and/or sea spray during operation of the aircraft. Flight conditions and measured environmental variables, such as ambient temperature and inlet temperature, help categorize the precipitation as rain, clouds, ice, sea spray, etc. In one or more non-limiting embodiments, the inclusion of sea water temperature can be monitored to enhance the detection.

In one or more non-limiting embodiments, the precipitation monitoring system utilizes an engine inlet debris monitoring system, which detects foreign object debris/damage (FOD) events by measuring electrostatic charge of particles passing through two measurement rings mounted on the inlet of the aircraft. The precipitation monitoring system analyzes the electrostatic charge and can detect precipitation particulates entering the engine inlet. The precipitation monitoring system includes an engine controller or engine control system or FADEC (Full Authority Digital Engine Control)) which applies a precipitation detection algorithm. The engine controller or FADEC can implement a digital computer (e.g., an electronic engine controller or engine control unit) and related accessories (e.g., a memory storing computer executable code) that control aspects of gas turbine engine performance. The controller or FADEC can further include one or more channels for communicating with various engine and/or aircraft sensors.

The precipitation detection algorithm detects environmental variables, such as precipitation, based on the level of electrostatic charge measured. The precipitation detection algorithm implements one or more precipitation envelopes, which takes into account various parameters including, but not limited to, ambient temperature, aircraft altitude, and the sensed electrostatic charge of precipitation particulates passing through the engine inlet to automatically (e.g., without crewmember input) signal the activation of an anti-ice system, preventing ice accretion on the inlet struts, vanes, nose cone.

In terms of the salt removal maintenance service, the precipitation monitoring system actively measures or estimates the amount of salt buildup accrued in the engine based on duration and intensity of electrostatic charge in the sea spray envelope, and generates an alert to perform the salt removal maintenance service when the measured salt buildup exceeds a given threshold. The sea spray envelope defines the conditions of potential sea spray exposure in terms of airspeed with respect to altitude. In this manner, water washing performed during a salt removal maintenance service can be performed after some level of measured salt ingestion to recover performance and stability margin. This type of condition-based maintenance protects the pilots and aircraft, while saving costs relative to the current water wash procedure, where salt removal services are performed at certain (e.g., pre-determined) intervals despite the level of salt buildup.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and delivery into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/see divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
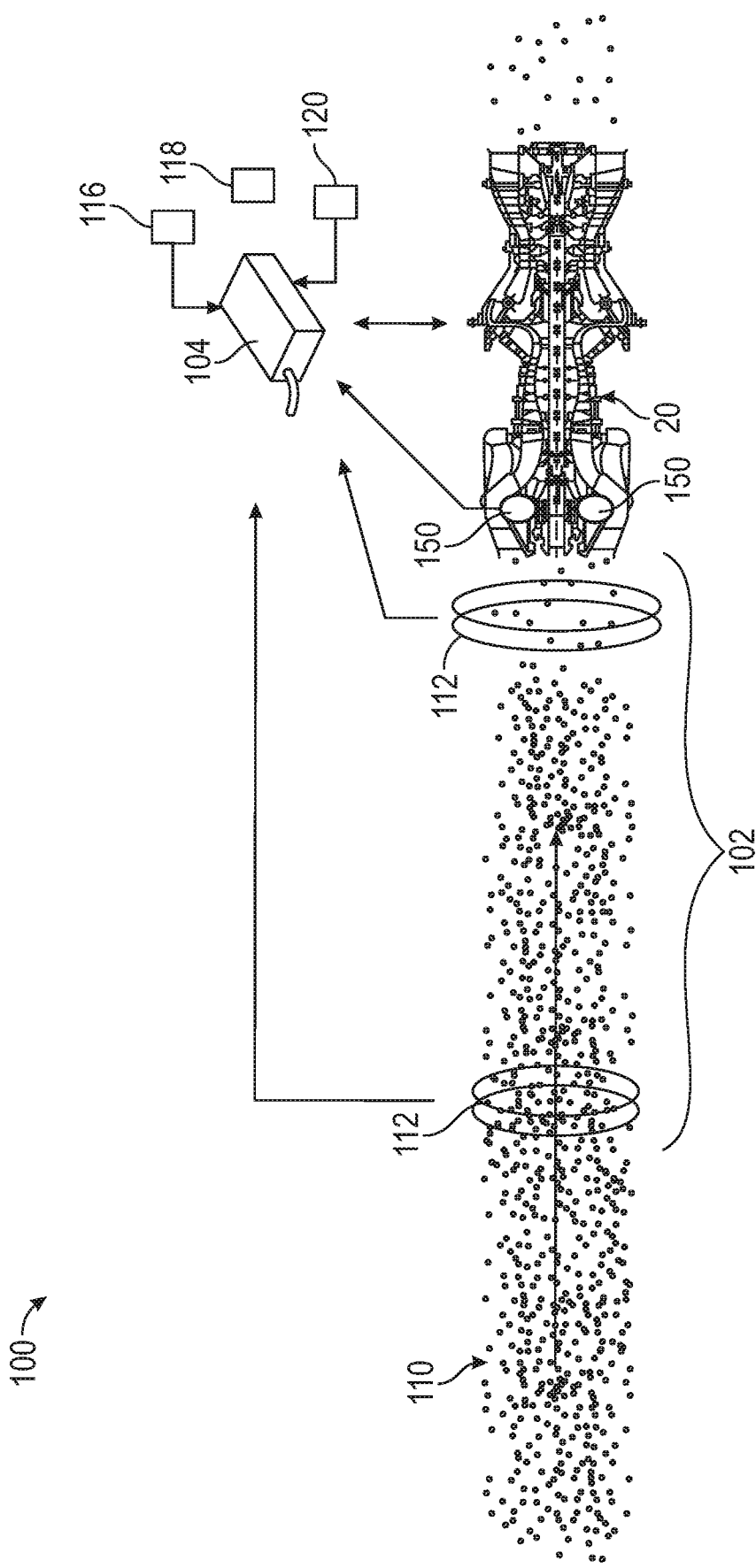
FIG. 2 is a schematic diagram of an aircraft precipitation monitoring system according to a non-limiting embodiment of the present disclosure.

FIG. 2 illustrates a precipitation monitoring system 100 according to a non-limiting embodiment. The precipitation monitoring system 100 includes a gas turbine engine 20 including, an inlet debris monitoring system 102, and an electronic engine control system 104. For clarity, the inlet debris monitoring system 102 is illustrated in a separated schematic view. As shown in FIG. 2, ambient air 110 containing an amount of particulate debris (e.g., particulates) enters the inlet of the engine 20. The particulate debris can include precipitation such as rain and/or ice particles, and/or can include salt particles present in sea spray. It should be recognized that the actual amount of particulate debris and/or the type of particulate debris present in the ambient air 110 will vary according to operating conditions.

In one or more non-limiting embodiments, the inlet debris monitoring system 102 is positioned where the ambient air 110 enters the inlet of the engine 20 and is configured to monitor a signal (e.g. electrical current, electromagnetic field, etc.) to detect debris as it passes the inlet debris monitoring system 102. In other non-limiting embodiments, the inlet debris monitoring system 102 can be present at the point where the debris has been separated from the ambient air 110, i.e. downstream of the blower. The magnitude of the signal is proportional to the size of the passing debris particles, and the duration of the signal indicates the quantity of particles in the ambient air 110. In one or more non-limiting embodiments, the inlet debris monitoring system 102 employs one or more electrostatic ring sensors 112. The ring sensors 112 can be disposed in the inlet duct of the engine 20 and are configured to generate an electrostatic field across the cross-sectional area of the inlet at the location of the sensors 112. The electrostatic ring sensors 112 monitor the intensity of the electrostatic field, detect the change of the electrostatic field in the sensing zone which is caused by the influence of particulates flowing through the electrostatic ring sensors 112, and output a signal indicating changes in the electrostatic field intensity. That is, changes in the output signals from the electrostatic ring sensors 112 are indicative of the presence of particulates (e.g., rain, ice, salt, etc.) entering the inlet of the engine 20. For example, the ring sensors 112 output a nominal electrostatic field intensity signal when no debris or precipitation flows through the engine inlet. As debris or precipitation begins flowing through the engine inlet, the electrostatic field intensity signal varies. Although a pair of electrostatic ring sensors 112 is illustrated, alternative embodiments may employ other types of inlet debris monitoring system sensors and/or a different numbers of sensors without departing from the scope of the present disclosure.

The electronic engine control system 104 is in signal communication with the gas turbine engine 20, the inlet debris monitoring system 102, and one or more aircraft sensors and/or engine sensors. The sensors include, but are not limited to, an altitude sensor 116, a temperature sensor 118, and an airspeed sensor 120. In one or more non-limiting embodiments, the electronic engine control system 104 is also in signal communication with an engine ice protection system 150. Various types of anti-icing system 150 can be implemented without departing from the scope of the invention. In some embodiments, for example, an electro-thermal or electrical heating system can be used, which utilizes heating coils embedded in the fan inlet, struts, and/or nose cone of the engine 20. The heating coils can be energized (e.g., using electrical current) to generate heat, which in turn prevents the formation of ice and/or melts existing ice formed in the engine 20.

The electronic engine control system 104 includes memory and a processor configured to execute algorithms and computer-executable program instructions stored in the memory. The electronic engine control system 104 can also store one or more envelopes (e.g., in memory), which take into account temperature, aircraft altitude, and/or sensed precipitation particulates passing through the engine inlet to detect the presence of sea spray or clouds, and/or the predicted accumulation of salt or ice.

Figure 3:
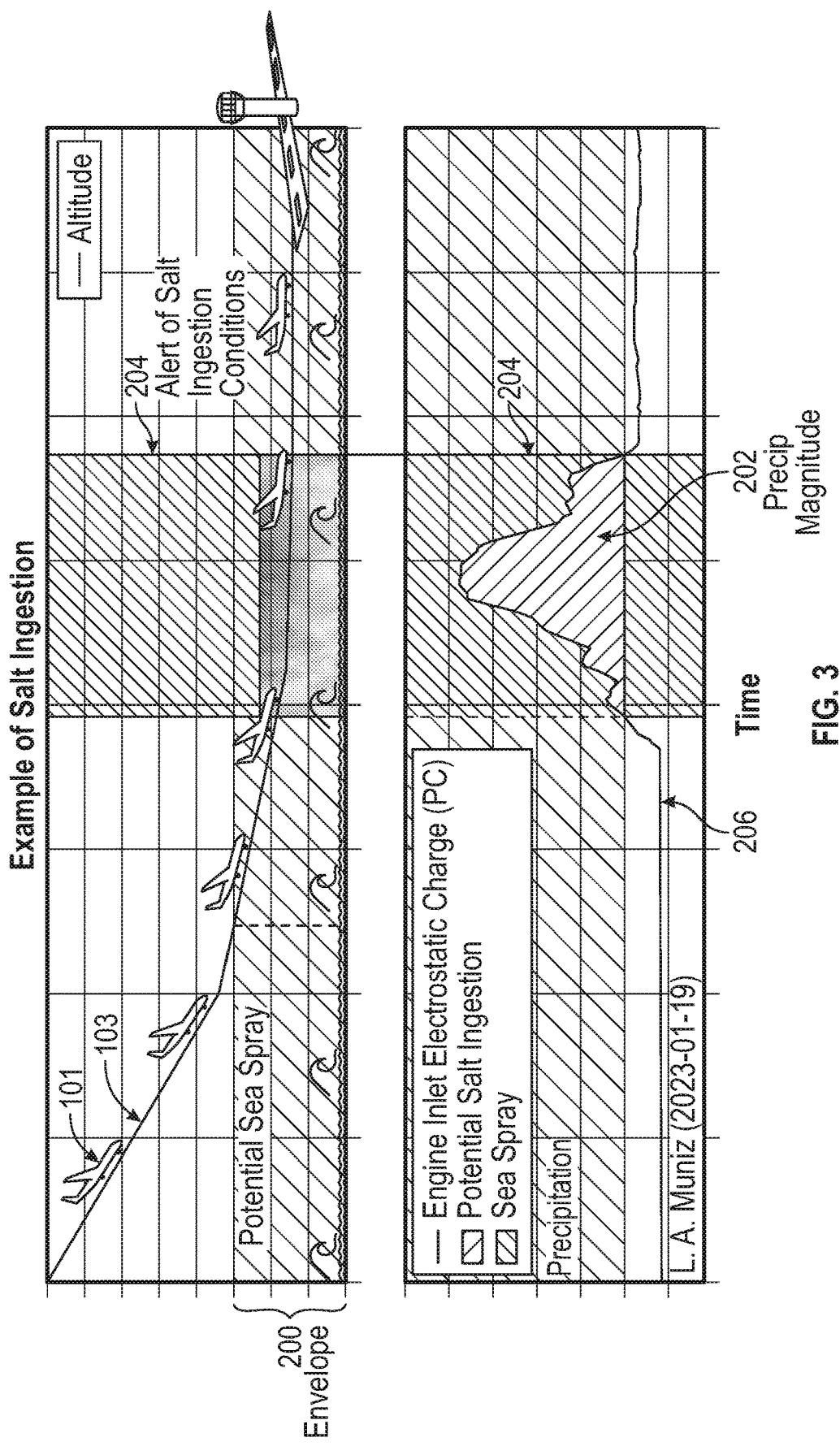
FIG. 3 is a diagram demonstrating a precipitation monitoring system detecting sea spray to alert ground crew personnel of a required water wash maintenance according to a non-limiting embodiment of the present disclosure.

Turning to FIG. 3, an example of salt ingestion detection performed by an aircraft precipitation monitoring system according to a non-limiting embodiment of the present disclosure. In this example, the aircraft precipitation monitoring system utilizes a salt ingestion envelope 200 and a level of precipitation 202 (e.g., a precipitation magnitude) to which the aircraft 101 is exposed to detect salt ingestion in the engine 20 of the aircraft 101. The salt ingestion envelope 200 contributes to the prediction of the potential salt ingestion by determining the presence of precipitation in the form of potential sea spray exposure of the aircraft 101 and an intensity of the electrostatic field intensity 206 (e.g., measured by the electrostatic ring sensors 112). The salt ingestion envelope 200 can also define an altitude range associated with the sea spray, and the controller can determine the presence of sea spray when the altitude is within the altitude range. For instance, the precipitation monitoring controller 104 can monitor the altitude 103 of the aircraft 101, and determine a level of precipitation 202 based on a potential amount of sea-spray to which the aircraft 101 is exposed as the aircraft's altitude 103 approaches sea level.

Meanwhile, the precipitation monitoring controller 104 can also monitor the electrostatic field intensity 206 indicated by the output of the electrostatic ring sensors 112. If salt particles begin entering the aircraft engine 20, the electrostatic field intensity 206 will increase. Accordingly, the aircraft precipitation monitoring system can generate an alert indicating the presence of salt contamination conditions 204 and a magnitude of salt ingestion into the engine 20 by correlating a level of precipitation 202 contributed by the presence of sea spray to the measured electrostatic field intensity 206.

Figure 4:
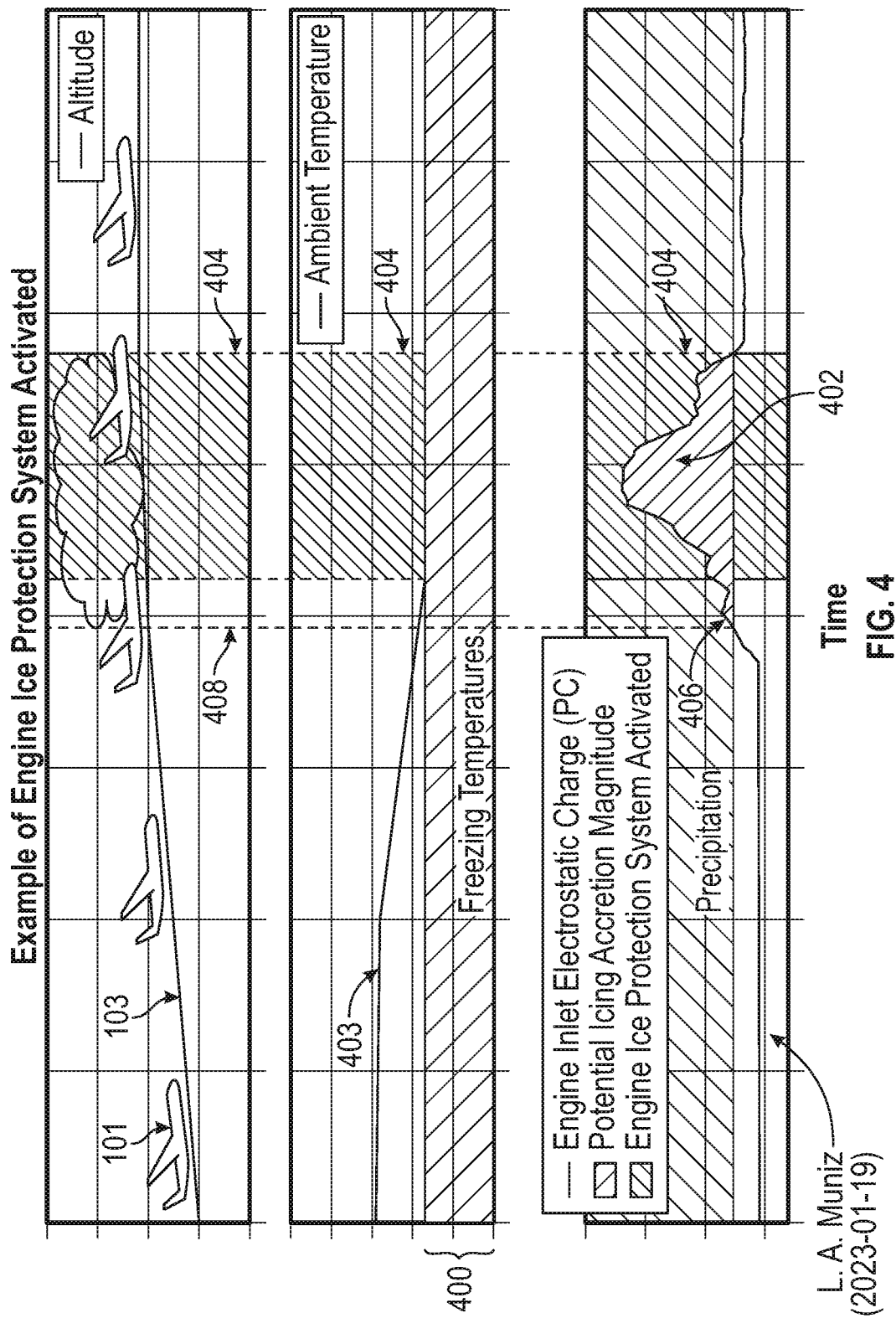
FIG. 4 is a diagram demonstrating a precipitation monitoring system detecting icing conditions and activating an engine ice protection system according to a non-limiting embodiment of the present disclosure.

FIG. 4 illustrates an example as to how the aircraft precipitation monitoring system can facilitate the prevention of ice accumulation in the gas turbine engine 20. In this example, the aircraft precipitation monitoring system utilizes an ice accumulation prevention envelope 400 and a level of precipitation 402 (e.g., a precipitation magnitude) to which the aircraft 101 is exposed. In this manner, the precipitation monitoring controller 104 can detect icing conditions 404 at which the accretion of ice (e.g., ice build-up) in the engine 20 is likely to occur.

The ice accumulation prevention envelope 400 contributes to the prediction of the ice accretion conditions by taking into account the ambient temperature 403 surrounding the aircraft 101 and an intensity of the electrostatic field intensity 406 (e.g., measured by the electrostatic ring sensors 112). In this manner, the precipitation monitoring controller 104 can determine the onset of ice accretion conditions and proactively perform an ice protection operation to prevent ice from accumulating in the engine 20. For instance, the precipitation monitoring controller 104 can monitor the altitude 103 of the aircraft 101 while also monitoring the surrounding ambient temperature 403. As the altitude 103 increases, the surrounding temperature 403 decreases, thereby exposing the aircraft 101 to the freezing temperatures set in the ice accumulation prevention envelope 400.

Meanwhile, the precipitation monitoring controller 104 can also monitor the electrostatic field intensity 406 indicated by the output of the electrostatic ring sensors 112. If precipitation particles begin entering the aircraft engine 20, e.g., while the aircraft 101 travels through cloud cover 408, the electrostatic field intensity 406 will increase. The surrounding temperature 403 at the time the aircraft 101 is exposed precipitation particles 408 effectively dictates the likelihood that ice will begin accumulating in the engine 20. Accordingly, the precipitation monitoring controller 104 can determine the onset of ice accretion conditions and proactively perform an ice protection operation 404 to prevent ice accretion in the engine 20. In at least one embodiment, the ice protection operation 404 includes activating one or more anti-ice systems (e.g., engine anti-ice, inlet anti-ice, aircraft anti-ice, etc.). In some embodiments, the controller 104 may be configured to automatically activate the one or more anti-ice systems, such as without input from a pilot or other crewmember.

Figure 5:
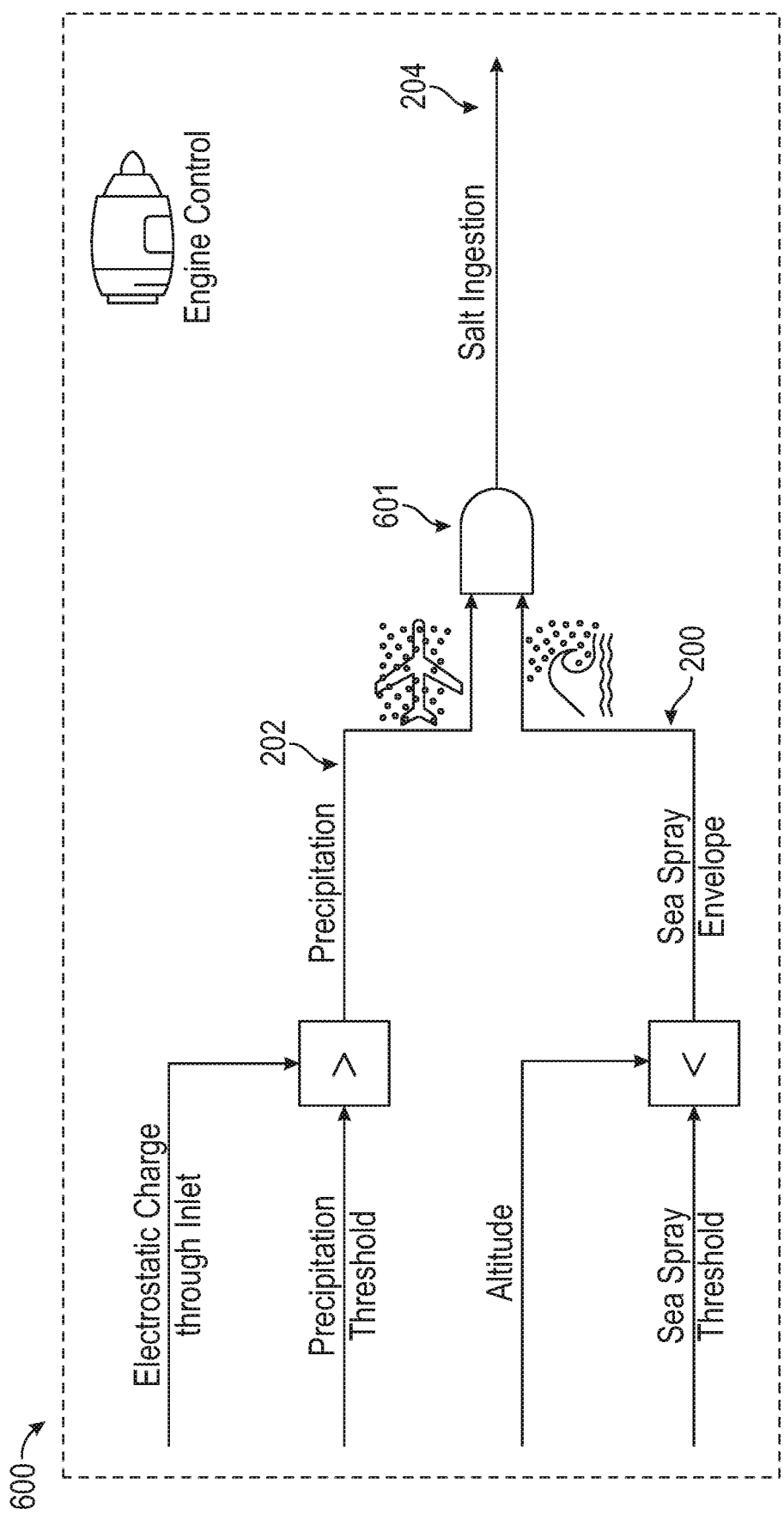
FIG. 5 depicts an engine salt ingestion detection algorithm utilized by the precipitation monitoring system shown in FIG. 2 according to a non-limiting embodiment of the present disclosure.

Turning now to FIG. 5, an engine salt ingestion detection algorithm 600 utilized by the precipitation monitoring system 100 is illustrated according to a non-limiting embodiment of the present disclosure. As described herein the precipitation monitoring controller 104 can store the algorithm engine salt ingestion detection algorithm 600 (e.g., in memory) and utilize it along with a sea spray envelope 200 to detect the ingestion of salt in the engine 20. The sea spray envelope 200 in this example is based at least in part on altitude (e.g., at or below 400 feet above ground level (AGL), at or below 200 feet mean sea level (MSL), etc.), but in other non-limiting embodiments the sea spray envelope 200 may include additional and/or alternative parameters including, but not limited to, airspeed and temperature.

A first stage of the salt ingestion detection algorithm 600 involves an electrostatic charge-to-charge intensity threshold comparison and an altitude-to-sea spray threshold comparison. Accordingly, this first stage determines whether the electrostatic charge intensity threshold is exceed while the aircraft is present in the sea spray envelope defined by aircraft altitude and airspeed. The sea spray envelope in this example is based at least in part on altitude, but in other non-limiting embodiments the sea spray envelope may include additional and/or alternative parameters including, but not limited to, airspeed and temperature.

The electrostatic charge-to-charge intensity threshold comparison involves comparing the electrostatic charge intensity output from the ring sensors 112 to a charge intensity threshold. When the electrostatic charge intensity is greater than the charge intensity threshold, it is determined that precipitation is entering the engine 20. The use of the charge intensity threshold at this stage allows for distinguishing precipitation particles from other types of non-precipitation debris or foreign objects that may enter the engine 20.

The altitude-to-sea spray threshold comparison compares the current altitude of the aircraft to a sea spray threshold. The sea spray threshold is set to an altitude range that will more than likely cover altitudes at which the aircraft may be potentially exposed to sea spray. When the altitude of the aircraft (e.g., as indicated by the output of the altitude sensor 116) is below the sea spray threshold (e.g., 50 feet, 100 feet, 500 feet, etc.), it is determined that the aircraft may encounter salt-containing sea spray and the precipitation monitoring controller 104 can obtain the sea spray envelope 400 (e.g., from memory).

A subsequent second stage of the salt ingestion detection algorithm 600 applies logic that determines salt ingestion in the engine 20. An "AND gate" 601, for example, can be implemented that receives a first input indicating detection of precipitation in the engine 20 and a second input indicating the aircraft is operating within the presence of sea spray as defined by the sea spray envelope. When both the presence of precipitation and conditions for sea spray exposure are true (e.g., binary "1"), the AND gate 601 outputs a salt ingestion detection signal (e.g., binary "1") indicating the detection of salt ingested into the engine 20. Accordingly, the precipitation monitoring controller 104 can output an alert to perform an engine water wash according to a salt removal maintenance service.

Figure 6:
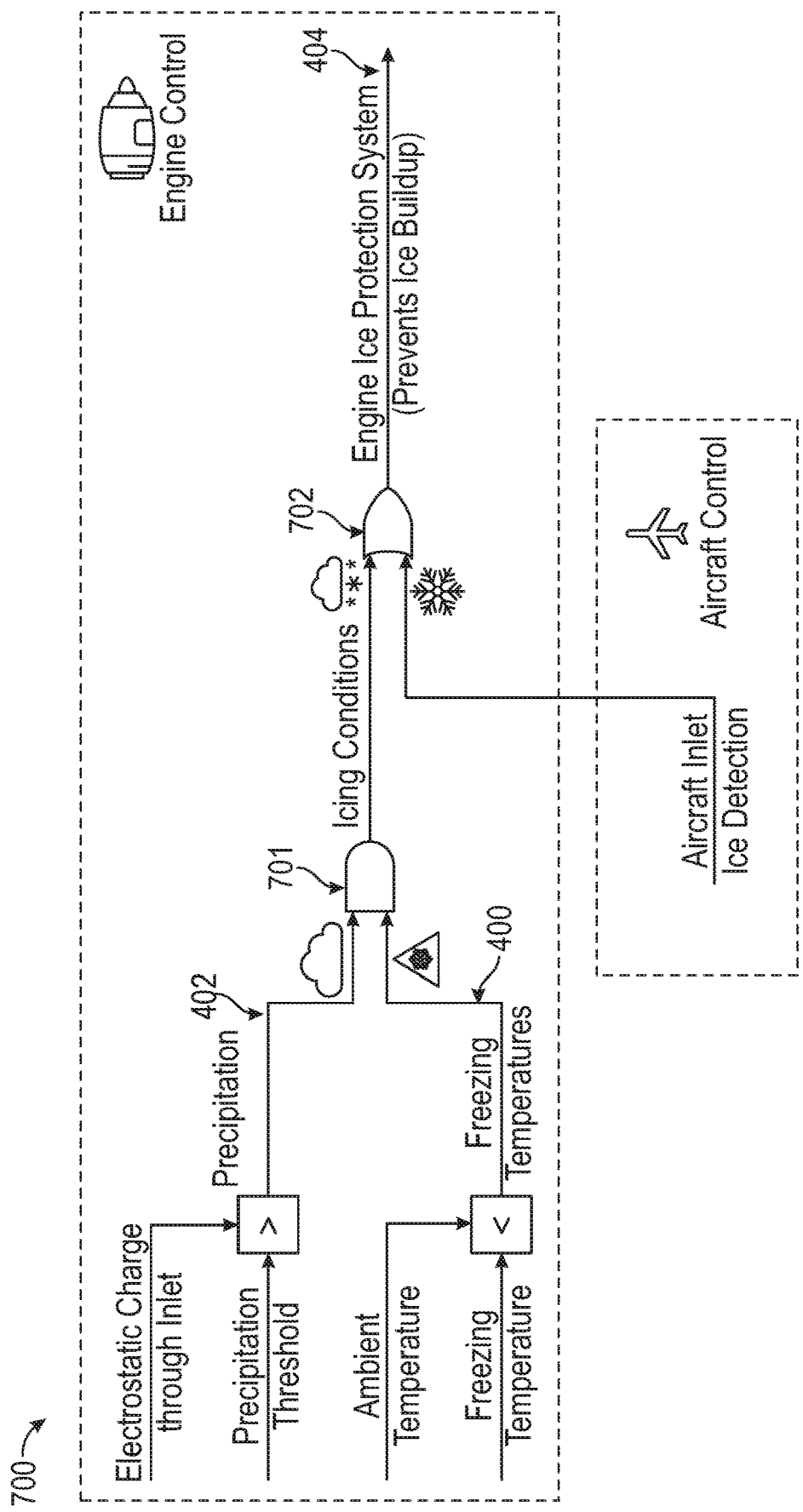
FIG. 6. depicts an ice prevention and detection algorithm utilized by the precipitation monitoring system shown in FIG. 2 according to a non-limiting embodiment of the present disclosure.

Turning to FIG. 6, an ice prevention and detection algorithm 700 utilized by the precipitation monitoring system 100 is illustrated according to a non-limiting embodiment of the present disclosure. As described herein the precipitation monitoring controller 104 can store the ice prevention and detection algorithm 700 (e.g., in memory) and utilize it along with the ice accumulation prevention envelope 400 and the ice detection envelope 500 to detect and/or prevent ice accumulation in the engine 20. In this example, the ice accumulation prevention envelope 400 and the ice detection prevention envelope 500 is based at least in part on altitude and ambient temperature, but in other non-limiting embodiments the ice accumulation prevention envelope 400 and/or the ice detection prevention envelope 500 may include additional and/or alternative parameters such as thrust, for example, without departing from the scope of the present disclosure.

A first stage of the ice prevention and detection algorithm 700 involves an electrostatic charge-to-charge intensity threshold comparison and an ambient temperature-to-freezing temperature comparison. The electrostatic charge-to-charge intensity threshold comparison involves comparing the electrostatic charge intensity output from the ring sensors 112 to a charge intensity threshold. When the electrostatic charge intensity is greater than the charge intensity threshold, it is determined that precipitation is entering the engine 20. The use of the charge intensity threshold at this stage allows for distinguishing precipitation particles from other types of non-precipitation debris or foreign objects that may enter the engine 20.

The ambient temperature-to-freezing temperature comparison compares the current ambient temperature surrounding the aircraft to freezing temperature threshold (e.g., 32 degrees Fahrenheit or 0 degrees Celsius), or freezing temperature range (e.g., at or below 5 degrees Celsius, at or below 10 degrees Celsius, etc.). When the ambient temperature (e.g., as indicated by the output of the temperature sensor temperature sensor 118) is below the freezing temperature threshold or falls within the freezing temperature range, it is determined that the aircraft is operating in freezing temperature conditions.

A subsequent second stage of the ice prevention and detection algorithm 700 applies logic that determines the aircraft is operating in icing conditions. An "AND gate" 701, for example, can be implemented that receives a first input indicating detection of precipitation in the engine 20 and a second input indicating the air craft is operating in freezing temperature conditions. When both the presence of precipitation and freezing temperature conditions are true (e.g., binary "1"), the AND gate 701 outputs an icing condition signal (e.g., binary "1") indicating the detection of icing conditions.

A subsequent third stage of the ice prevention and detection algorithm 700 applies logic that determines whether to invoke the aircraft's engine ice protection system to prevent ice building up or mitigate any further progression of ice buildup. An "OR gate" 702, for example, can be implemented which includes a first input that receives the icing condition signal output from the AND gate 701 and a second input that receives engine ice detection confirmation signal. The engine ice detection confirmation signal can be generated in response to detecting the accumulation of ice in the engine 20 according to the ice detection envelope 500 and/or from a separate or independent ice detection system or ice detection sensor installed on the aircraft. In response to receiving the icing condition signal and/or the ice detection confirmation signal, the "OR gate" 702 output an engine ice protection activation signal, which activates the aircraft's engine ice protection system. Activation of the engine ice protection system can include activating the aircraft anti-icing system 150 so as to prevent the accretion of ice in engine 20 and/or melt any ice that may have formed in the engine 20.

Figure 7:
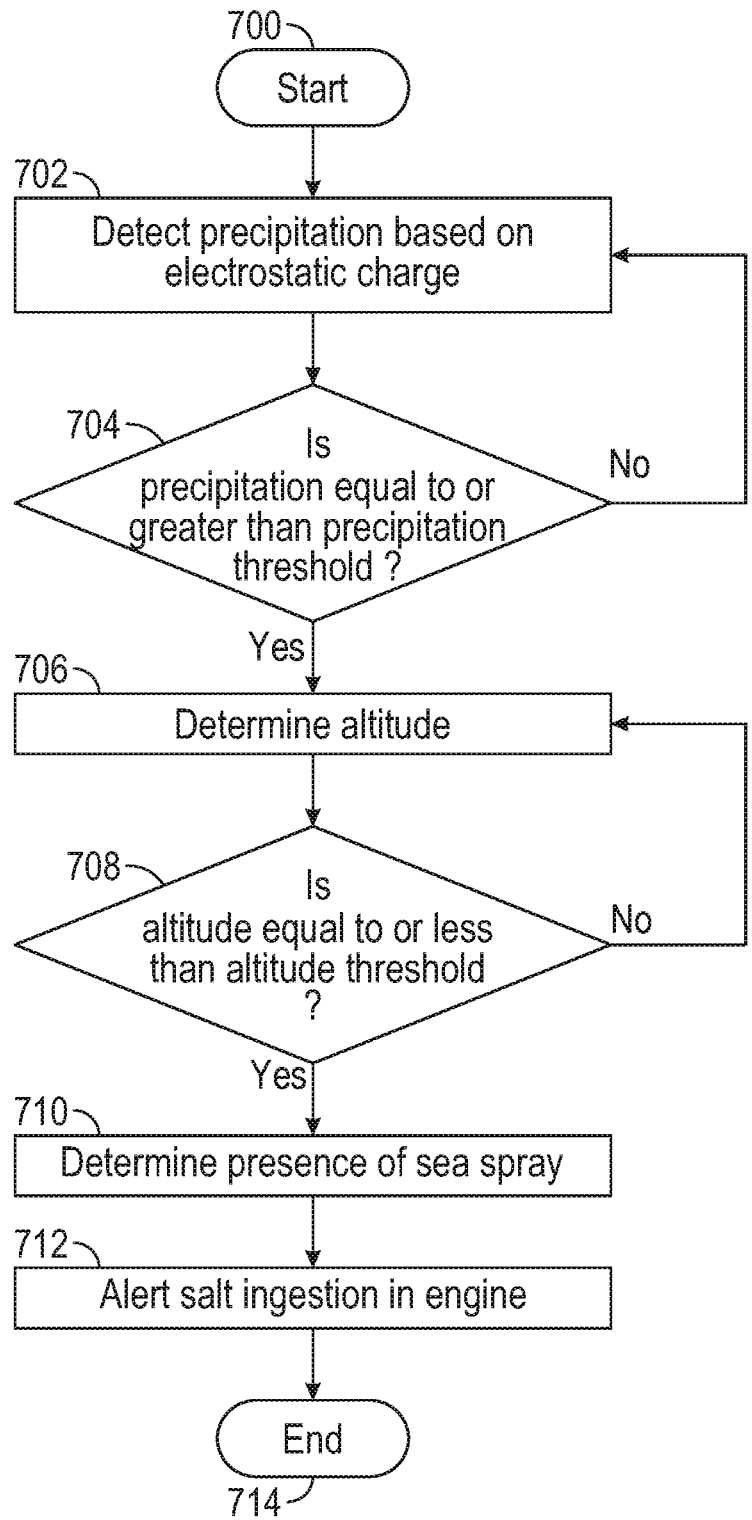
FIG. 7 is a flow diagram illustrating a method of alerting sea salt ingestion in an aircraft engine.

Turning now to FIG. 7, a method of alerting sea salt ingestion in an aircraft engine is described according to a non-limiting embodiment. The method begins at operation 700, and the presence of precipitation is detected 702. The precipitation can be detected based on an intensity of electrostatic charge indicated by one or more electrostatic charge ring sensors installed on the aircraft. At operation 704, the precipitation is compared to a precipitation threshold. When the precipitation is not greater than the precipitation threshold, the method returns to operation 702 and continues detecting the presence of precipitation. When, however, the precipitation is greater than the precipitation threshold, the altitude of the aircraft is determined at operation 706 and the altitude is compared to an altitude threshold at operation 708. When the altitude is greater than or equal to an altitude threshold, the method returns to operation 706 and continues determining the altitude. When, however, the, altitude is less than the altitude threshold, the presence of sea spray is determined at operation 710. At operation 712, sea salt ingestion into the engine is alerted and the method ends at operation 714.

Figure 8:
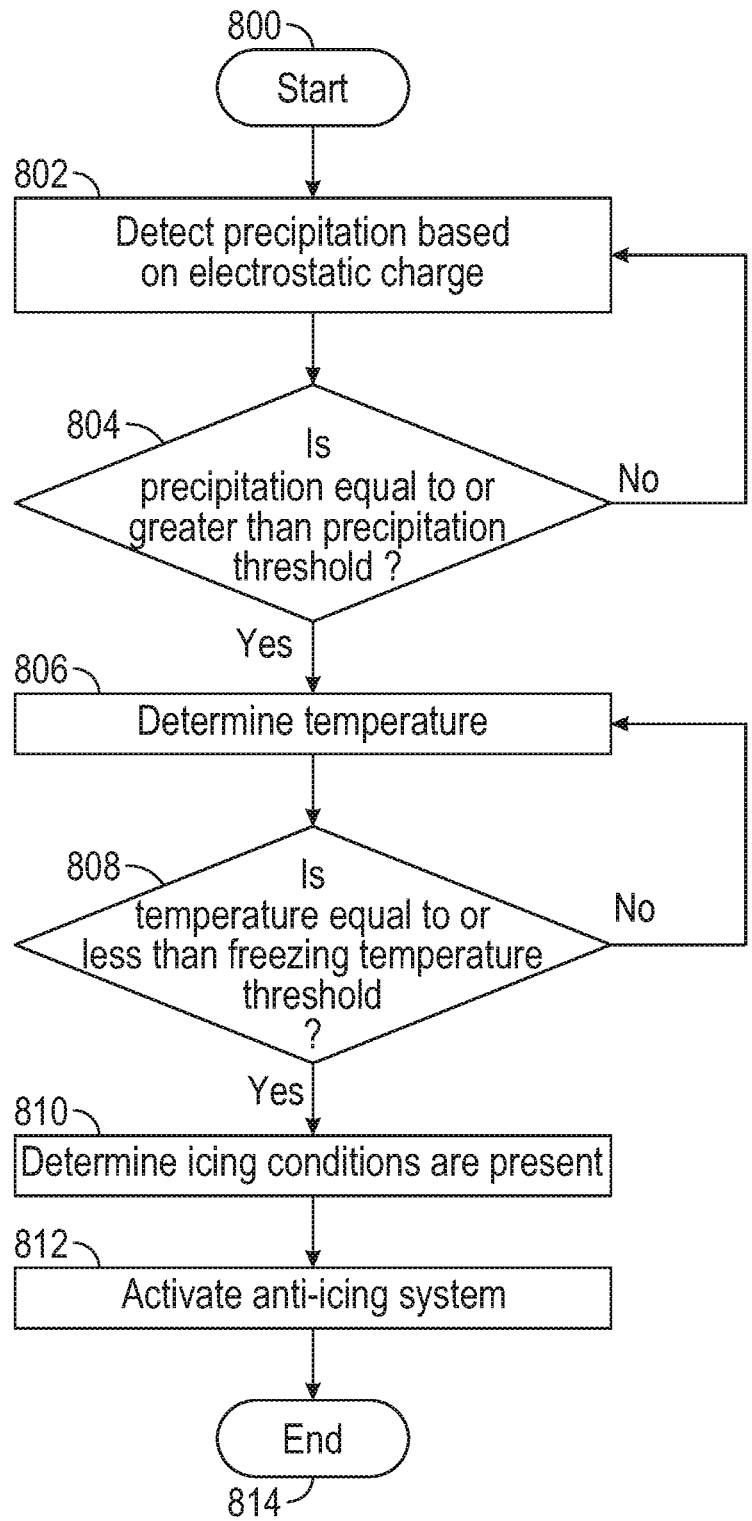
FIG. 8 is a flow diagram illustrating a method of controlling an anti-icing system of an aircraft.

Turning now to FIG. 8, a method of controlling an anti-icing operation of an aircraft engine is described according to a non-limiting embodiment. The method begins at operation 800, and the presence of precipitation is detected at operation 802. The precipitation can be detected based on an intensity of electrostatic charge indicated by one or more electrostatic charge ring sensors installed on the aircraft. At operation 804, the precipitation is compared to a precipitation threshold. When the precipitation is not greater than the precipitation threshold, the method returns to operation 802 and continues detecting the presence of precipitation. When, however, the precipitation is greater than the precipitation threshold, the temperature of the aircraft is determined at operation 806 and the temperature is compared to a temperature threshold at operation 808. When the temperature is greater than the temperature threshold, the method returns to operation 806 and continues determining the altitude. When, however, the, temperature is less than or equal to the temperature threshold, the icing conditions are determined. At operation 812, the aircraft anti-icing system is activated to melt accumulated ice and/or to prevent ice accretion, and the method ends at operation 814.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a gas turbine engine including an inlet configured to ingest air and generate thrust to power an aircraft;
   an altitude sensor configured to measure an altitude of the aircraft;
   an electrostatic charge sensor inlet debris monitoring system configured to detect particulates entering the inlet; and
   a precipitation monitoring controller in signal communication with the inlet debris monitoring system and the altitude sensor, the precipitation monitoring controller configured to determine a presence of sea spray based on the altitude and the presence of precipitation based on an amount of particulates entering the inlet,
   wherein the precipitation monitoring controller detects an ingestion of salt into the gas turbine engine in response to detecting a presence of both the sea spray and the amount of particulates entering the inlet,
   wherein the presence of sea spray is determined based on a sea spray envelope stored in the precipitation monitoring controller which defines an altitude range associated with the sea spray, and wherein the controller determines the presence of sea spray when the altitude is within the altitude range,
   wherein the inlet debris monitoring system includes at least one electrostatic ring sensor in signal communication with the precipitation monitoring controller and configured to generate an electrostatic field having a charge intensity, and wherein the precipitation monitoring controller determines the amount of particulates entering the gas turbine engine based on the charge intensity of the electrostatic field, and
   wherein the precipitation monitoring controller monitors the altitude while monitoring the charge intensity of the electrostatic field and generates an alert indicating a presence of salt contamination conditions when the altitude approaches sea level and in response to detecting an increase in the charge intensity that lasts for a duration of time and in response to the time duration during which the increase that occurs exceeds a time threshold,
   determines a magnitude of salt ingestion into the engine by correlating a level of precipitation contributed by the presence of sea spray to the charge intensity of the electrostatic field,
   wherein the precipitation monitoring controller compares the charge intensity to a charge intensity threshold, and determines the presence of precipitation containing the salt in response to the charge intensity meeting or exceeding the charge intensity threshold, and
   wherein the precipitation monitoring controller estimates an amount of the salt accrued in the engine based on the charge intensity and the duration of the increase in the charge intensity, and generates an alert to perform the salt removal maintenance service when the estimated amount of the salt accrued in the engine exceeds an accrued salt threshold.

2. The system of claim 1, wherein the controller generates an alert to perform a salt removal maintenance service in response to detecting the ingestion of salt.

3. The system of claim 1, wherein precipitation monitoring controller detects the ingestion of salt in response to determining both the presence of precipitation and the charge intensity meeting or exceeding the charge intensity threshold, and determines an amount of ingested salt based on the charge intensity meeting or exceeding the charge intensity threshold and an airspeed of the aircraft.

4. The system of claim 1, further comprising:
a temperature sensor in signal communication with the precipitation monitoring controller and configured to measure an ambient temperature of the gas turbine engine,
wherein the precipitation monitoring controller is configured to determine the presence of icing conditions based on the ambient temperature and the amount of particulates entering the inlet.

5. The system of claim 4, further comprising an anti-icing system coupled to the gas turbine engine and configured to heat the inlet of the engine in response to receiving an activation signal from the precipitation monitoring controller,
wherein the precipitation monitoring controller outputs the activation signal in response to at least one of determining the presence of the icing conditions and detecting accretion of ice in the gas turbine engine.

6. The system of claim 5, wherein the controller stores an icing accretion model defining potential ice accretion in the gas turbine engine based on at least one of a temperature range and an altitude, and wherein the controller determines the presence of the icing conditions when the ambient temperature is within the temperature range.

7. A method of detecting salt ingestion in a gas turbine engine of an aircraft, the method comprising:
measuring an altitude of the aircraft;
generating, by a at least one electrostatic ring sensor, an electrostatic field having a charge intensity;
determining an amount of particulates entering the gas turbine engine based on the charge intensity of the electrostatic field;
defining an altitude range associated with sea spray according to a sea spray envelope;
determining a likelihood of a presence of sea spray is at or above a first threshold based on the altitude;
determining a presence of precipitation based on a determination that an amount of particulates entering the inlet is at or above a second threshold; and
detecting an ingestion of salt into the gas turbine engine in response to determining that the likelihood of the presence of sea spray is at or above the first threshold and the presence of precipitation; and
monitoring the altitude while monitoring the charge intensity of the electrostatic field and generating a first alert indicating a presence of salt contamination conditions when the altitude approaches sea level and in response to detecting an increase in the charge intensity that lasts for a duration of time and in response to the time duration during which the increase that occurs exceeds a time threshold;
determining a magnitude of the salt ingestion into the engine by correlating a level of precipitation contributed by the presence of sea spray to the charge intensity of the electrostatic field;
comparing the charge intensity to a charge intensity threshold, and determines the presence of precipitation including the salt in response to the charge intensity meeting or exceeding the charge intensity threshold;
estimating an amount of the salt accrued in the engine based on the charge intensity and the duration of the increase in the charge intensity; and
generating a second alert to perform the salt removal maintenance service when the estimated amount of the salt accrued in the engine exceeds an accrued salt threshold.

8. The method of claim 7, further comprising generating an alert to perform a salt removal maintenance service in response to detecting the ingestion of salt.

9. The method of claim 7, further comprising detecting the ingestion of salt in response to determining both the presence of precipitation and the charge intensity exceeding the charge intensity threshold and determining an amount of ingested salt based on the charge intensity meeting or exceeding the charge intensity threshold and an airspeed of the aircraft.

10. The method of claim 7, further comprising:
measuring an ambient temperature of the gas turbine engine; and
determining a presence of icing conditions based on the ambient temperature and the amount of particulates entering the inlet.

11. The method of claim 10, further comprising heating the inlet of the engine in response to at least one of determining the presence of the icing conditions and detecting accretion of ice in the gas turbine engine.

12. The method of claim 11, wherein at least one of the presence of the icing conditions and the accretion of ice in the gas turbine engine is determine based on an icing accretion model defining potential ice accretion in the gas turbine engine.

* * * * *